United States Patent
Willis

(10) Patent No.: US 7,398,005 B2
(45) Date of Patent: Jul. 8, 2008

(54) TRICK MODE PLAYBACK OF RECORDED VIDEO

(75) Inventor: Donald H. Willis, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1137 days.

(21) Appl. No.: 10/021,285

(22) Filed: Dec. 19, 2001

(65) Prior Publication Data

US 2003/0113098 A1    Jun. 19, 2003

(51) Int. Cl.
*H04N 5/91* (2006.01)
(52) U.S. Cl. .......................... 386/68; 386/111; 386/112
(58) Field of Classification Search .................. 386/46, 386/68, 109, 111, 112, 125
See application file for complete search history.

(56) References Cited

U.S. PATENT DOCUMENTS

| | | | | |
|---|---|---|---|---|
| 5,786,858 A | * | 7/1998 | Yagasaki et al. | 375/240.15 |
| 5,841,938 A | | 11/1998 | Nitta et al. | |
| 5,974,224 A | * | 10/1999 | Nagata | 386/109 |
| 6,009,229 A | | 12/1999 | Kawamura | |
| 6,154,603 A | | 11/2000 | Willis et al. | |
| 6,876,812 B1 | * | 4/2005 | Tanabe | 386/68 |
| 6,898,246 B2 | * | 5/2005 | Katayama | 375/240.25 |

* cited by examiner

*Primary Examiner*—Huy T Nguyen
(74) *Attorney, Agent, or Firm*—Joseph J. Laks; Robert B. Levy; Jorge Tony Villabon

(57) ABSTRACT

The present invention concerns a method (200) and system (100) for producing a trick mode playback of a segment of video containing a plurality of predictive pictures. The invention includes the steps of: (a) decoding (212) a portion of a predictive picture from the plurality of predictive pictures; and (b) updating (214) a portion of information stored in a memory with the portion of the predictive picture. In one arrangement, the invention can further include the step of repeating steps (a) and (b) during the trick mode playback such that a portion of each of a predetermined number of subsequent predictive pictures can be decoded and can be used to update a subsequent portion of the information stored in the memory. In addition, the segment of video can be an MPEG video segment that does not contain any intra pictures and each of the plurality of predictive pictures can contain intra macroblocks.

20 Claims, 2 Drawing Sheets

TRICK MODE PLAYBACK OF RECORDED VIDEO

BACKGROUND OF THE INVENTION

1. Technical Field

The inventive arrangements relate generally to video recording systems and more particularly to video recording systems that record digitally encoded video sequences onto disc media such as recordable digital video discs, hard drives and magneto optical discs.

2. Description of Related Art

MPEG video generally uses three types of picture coding methods: Intra (I) pictures, predictive (P) pictures and bidirectional predictive (B) pictures. I pictures are encoded or decoded independently of any other picture. This creates a reference picture from which P and B pictures, or non-I pictures, can be constructed.

A number of MPEG video signals, however, are encoded without I pictures. In particular, many U.S. cable systems broadcast MPEG signals that do not contain I pictures. At first glance, such a video signal appears impossible to decode since there are no I pictures from which to construct the P and B pictures.

Nevertheless, a video signal without any I pictures can be decoded by most MPEG decoders because a separate portion of each P picture in the signal is typically composed of I macroblocks. That is, successive P pictures containing I macroblocks can be used to eventually properly decode a P picture, which can then be used to decode the remaining pictures in the video signal. As an example, in a block of five P pictures, twenty percent of each P picture can contain I macroblocks. For example, the top twenty percent of the first P picture can be composed of I macroblocks and the lower eighty percent can be composed of P macroblocks. Referring to the second P picture in the video signal, the portion representing the twenty percent of the picture immediately below the top twenty percent can comprise I macroblocks while the lower sixty percent and the top twenty percent can be composed of P macroblocks. Thus, a different portion of each successive P picture contains I macroblocks. Hence, the bottom twenty percent of the last P picture can contain I macroblocks.

These I macroblocks, along with the P macroblocks contained in the P pictures, can be used to assemble each successive P picture. Specifically, as each P picture is decoded, the decoded I and P macroblocks can be stored in memory. As such, the decoder can generally properly decode the fifth P picture, from which the remaining P and B pictures can be properly decoded.

During normal playback of a video signal having no I pictures, there is a brief period in which the picture quality suffers at the initiation of the playback. This is because the pictures at the beginning of the playback must be constructed from the P pictures that are not yet properly decoded. As an example, the first P picture in the playback signal normally contains the first portion of I macroblocks. Thus, the P and B pictures that are constructed from the first P picture cannot be properly decoded, as the first P picture contains only roughly twenty percent of the information needed to produce these pictures. As the playback continues, however, the picture quality improves since more of the P pictures are decoded thereby providing a greater number of correctly decoded I and P macroblocks until a properly decoded P picture is acquired. This initial reduction in picture quality is acceptable since it is brief, and a properly decoded picture is usually constructed within the first one-half to one second of normal playback of the video.

Significantly, however, initiating a trick mode command once the properly decoded P picture is obtained may cause problems in the decoding of subsequent pictures. Specifically, during a trick mode such as fast forward or fast reverse, a plurality of pictures are skipped to speed up the playback. If P pictures containing the I macroblocks are skipped, then the subsequent pictures that would have been predicted from the skipped P pictures can no longer be properly decoded, and the display of these pictures will be negatively affected during the trick mode. Similarly, initiating a fast motion trick mode command before a properly decoded P picture is acquired may be problematic as well, as P pictures containing I macroblocks are likely to be skipped and the user may have a difficult time recognizing sections of the video on which the fast motion trick mode is being performed. Thus, a need exists for a method and system for performing fast motion trick modes without requiring the prediction of a picture or a portion of a picture from another picture or increasing system costs or complexity.

SUMMARY OF THE INVENTION

The present invention concerns a method of producing a trick mode playback of a segment of video containing a plurality of predictive pictures. Specifically, the method includes the steps of: (a) decoding a portion of a predictive picture from the plurality of predictive pictures; and (b) updating a portion of information stored in a memory with the portion of the predictive picture. The method can also include the step of repeating steps (a) and (b) during the trick mode playback such that a portion of each of a predetermined number of subsequent predictive pictures are decoded and used to update a subsequent portion of the information stored in the memory. In addition, each subsequent predictive picture can have been recorded after or prior to the predictive picture.

In another arrangement, step (b) can further include the step of updating a portion of the information stored in the memory exclusively with the portion of the predictive picture. The portion of the predictive picture that is decoded can have a substantially direct correspondence to the portion of the information stored in the memory that is being updated. Moreover, the segment of video can be an MPEG video segment that does not contain any intra pictures, and each of the plurality of predictive pictures can contain intra macroblocks. Also, the portion of the predictive picture can be comprised of intra macroblocks. In another arrangement, a playback speed of the fast motion trick mode in a forward direction can be greater than 3X. The information stored in the memory can be a picture, and this picture can initially be a properly decoded picture.

The present invention also concerns a system for producing a trick mode playback of a segment of video containing a plurality of predictive pictures. Specifically, the system includes a memory for storing information; and a video processor programmed to: decode a portion of a first predictive picture from the plurality of predictive pictures; and update a portion of the information stored in the memory with the portion of the first predictive picture. The system also includes suitable software and circuitry to implement the methods as described above.Brief

DETAILED DESCRIPTION

Figure 1:
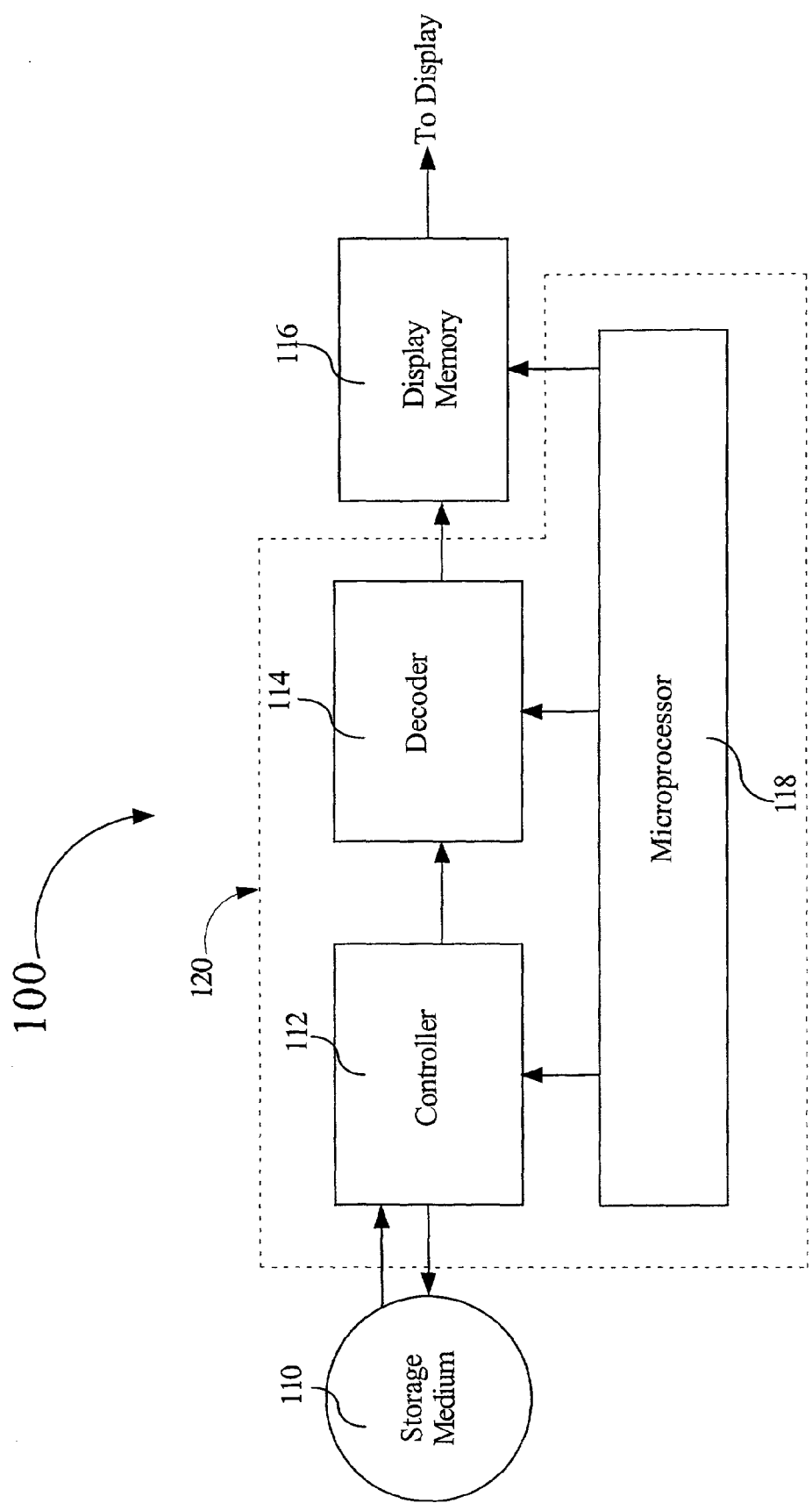
FIG. 1 is a block diagram of a storage medium device that can perform fast motion trick mode playback of recorded video in accordance with the inventive arrangements herein.

A system or storage medium device 100 for implementing the various advanced operating features in accordance with the inventive arrangements is shown in block diagram form in FIG. 1. The invention, however, is not limited to the particular system illustrated in FIG. 1, as the invention can be practiced with any other storage medium device capable of receiving a digitally encoded signal. In addition, the system 100 is not limited to reading data from or writing data to any particular type of storage medium, as any storage medium capable of storing digitally encoded data can be used with the system 100.

The system 100 can include a controller 112 for reading data from and writing data to a storage medium 110. The system 100 can also have a microprocessor 118. Control and data interfaces can also be provided for permitting the microprocessor 118 to control the operation of a decoder 114, a display memory 116 and the controller 112. Suitable software or firmware can be provided in memory for the conventional operations performed by the microprocessor 118. Further, program routines can be provided for the microprocessor 118 in accordance with the inventive arrangements. It should be understood that all or portions of the microprocessor 118, the decoder 114 and the controller 112 can be considered a video processor 120 within contemplation of the present invention.

In operation, a fast motion trick mode can be initiated, and the controller 112 can read a video signal containing a plurality of P pictures from the storage medium 110. The P pictures in this video signal can contain a number of I and P macroblocks. In one arrangement, the signal does not contain any I pictures; however, it should be noted that the invention is not limited in this regard, as a fast motion trick mode in accordance with the inventive arrangements can be performed on a signal containing I pictures.

The decoder 114 can then decode a portion of a P picture from the plurality of P pictures. The decoded portion of this P picture can then be sent to the display memory 116, where it can be used to update a portion of information stored in the display memory 116. During the trick mode, the decoder 114 can continue to decode the video signal such that a portion of each of a predetermined number of subsequent P pictures can be decoded. These decoded portions can then update a subsequent portion of the information stored in the display memory 116. This process will be explained in greater detail in the next section.

Trick Mode Playback of Recorded Video

Figure 2:
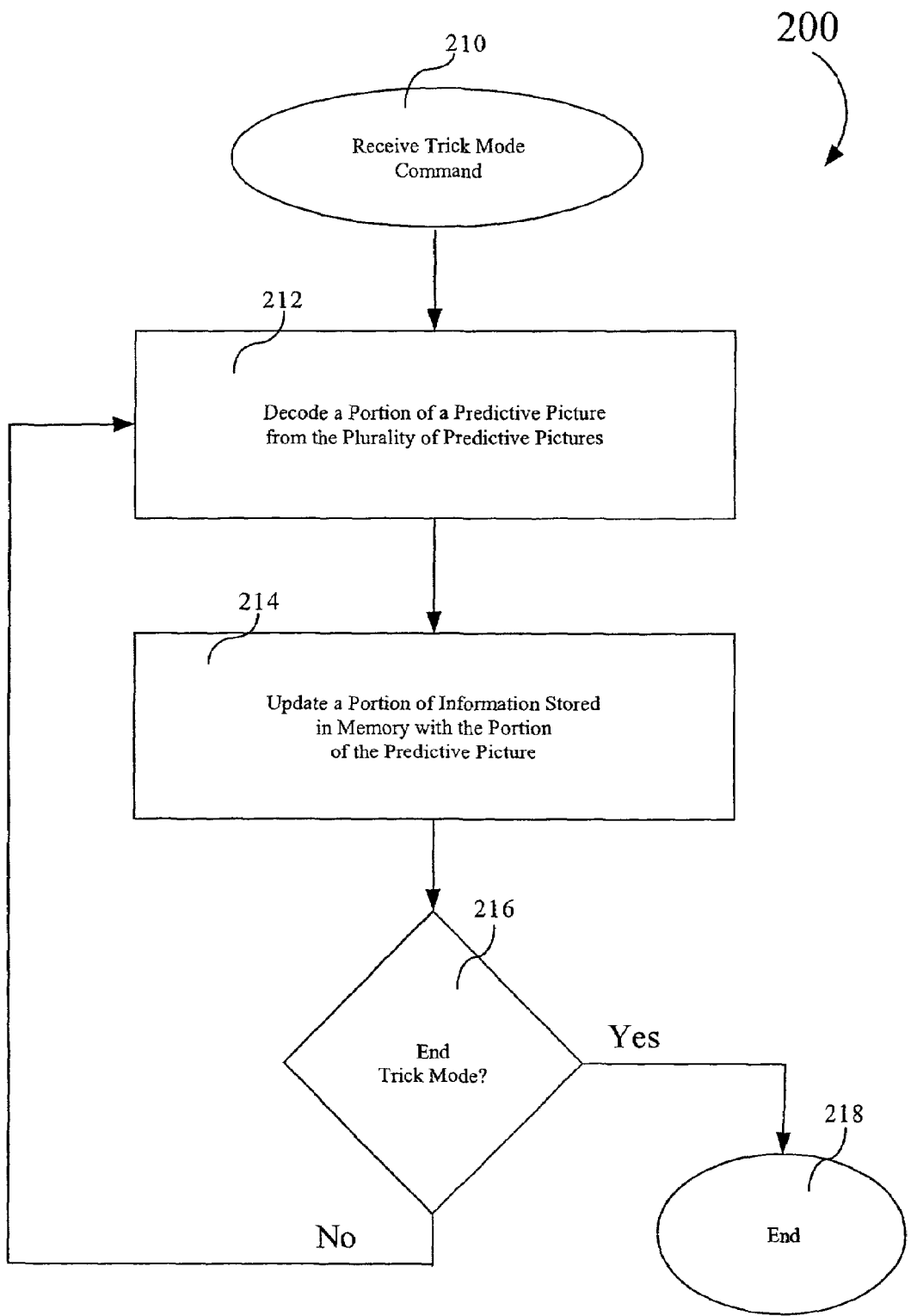
FIG. 2 is a flow chart that illustrates an operation of performing a fast motion trick mode playback of recorded video in accordance with the inventive arrangements.

FIG. 2 illustrates a flowchart 200 that demonstrates one way in which a fast motion trick mode playback of a segment of video containing a plurality of P pictures can be produced. It is understood that fast motion trick mode playback, for purposes of the invention, can mean either fast-forward or fast-reverse playback.

At step 210, a trick mode command can be received. The trick mode can be a fast motion trick mode to be performed on a segment of video containing a plurality of P pictures. In one arrangement, the segment of video can be an MPEG video segment that does not contain any I pictures in which a portion of each P picture includes I macroblocks; however, it is understood that the invention is not so limited, as the invention can be practiced with other suitable types of digitally encoded signals including an MPEG signal that has I pictures. The trick mode can be a fast-forward trick mode or a fast-reverse trick mode. Once the trick mode command is received, a portion of a P picture from the plurality of P pictures can be decoded, as shown in step 212.

At step 214, a portion of information stored in memory can be updated with the portion of the P picture that was decoded. The information stored in memory can be a picture, such as an I, B or P picture, or any other suitable piece of data capable of being updated with the portion of the P picture that was decoded. Although not limited to any particular example, if the information is a picture, the picture can, at least initially, be a properly decoded picture. This may occur, for example, if the fast trick mode is initiated after a properly decoded picture has been acquired from the video segment.

In one arrangement, the portion of the P picture that is decoded can be used exclusively to update a portion of the information stored in memory. In addition, the portion of the P picture that is decoded and used to update the information stored in memory can have a substantially direct correspondence to the portion of the information stored in memory that is being updated. As an example, if the top 20% (approximately 20%) of the P picture is decoded, then that particular decoded portion can be used to update the top 20% (approximately 20%) of the information stored in memory.

In one particular arrangement, the portion of the P picture that is decoded and used to update a portion of the information stored in memory can be comprised of I macroblocks. Thus, referring back to the above example, if approximately 20% of the P picture is comprised of I macroblocks, then this particular 20% portion containing I macroblocks can be used to update a portion of the information stored in memory. Using I macroblocks to update a portion of the information stored in memory can lead to faster trick mode speeds, as the I macroblocks do not require any memory accesses for predictors, something that is required for P or B macroblocks. Also, performing trick modes in this fashion can eliminate the need for predicting pictures from other pictures during the trick mode. It is understood that the invention is not limited to the foregoing examples, as any other suitable portion of the P picture can be used to update any suitable portion of the information stored in memory.

Referring back to flowchart 200, at decision block 216, if the trick mode is to continue, then the process can be reinitiated at step 212. As a result, during the trick mode, steps 212 and 214 can be repeated in accordance with the previous discussion such that a portion of each of a predetermined number of subsequent P pictures can be decoded and used to update a subsequent portion of the information stored in memory. Thus, portions of the information stored in memory can be continuously updated with portions of the subsequent P pictures contained in the video. The number of subsequent P pictures that are decoded can be based on the speed of the trick mode. As an example, as the speed of the trick mode increases, the number of subsequent P pictures to be partially decoded can decrease. Also, as the invention applies to both fast-forward and fast-reverse trick modes, each of the subsequent pictures can be either recorded after or prior to the predictive picture referred to in the discussion concerning step 212. If the trick mode is stopped, flowchart 200 can end at step 224.

In one arrangement, for fast motion speeds of 3X or less (1X represents normal playback speed) in a forward direction, substantially all the information stored in memory can be updated as opposed to a mere portion of the information. For example, if a fast-forward trick mode with a speed of 3X is initiated, then a properly decoded P picture can be obtained and each of the subsequent P pictures in the video segment can still be properly decoded, as skipping only the B pictures in the video stream can produce a playback speed of 3X.

Although the present invention has been described in conjunction with the embodiments disclosed herein, it should be understood that the foregoing description is intended to illustrate and not limit the scope of the invention as defined by the claims.

What is claimed is:

1. A method of producing a trick mode playback of a segment of video containing a plurality of predictive encoded pictures comprising the steps of:
    (a) decoding a portion of a predictive picture from the plurality of predictive pictures without decoding the predictive picture in its entirety;
    (b) updating a portion of information stored in a memory with the portion of the predictive picture; and
    (c) repeating steps (a) and (b) during the trick mode playback such that a portion of each of a predetermined number of subsequent predictive pictures are decoded and used to update a subsequent portion of the information stored in the memory.

2. The method according to claim 1, wherein each subsequent predictive picture has been recorded after the predictive picture.

3. The method according to claim 1, wherein each subsequent predictive picture has been recorded prior to the predictive picture.

4. The method according to claim 1, wherein step (b) further comprises the step of updating a portion of the information stored in the memory exclusively with the portion of the predictive picture.

5. The method according to claim 4, wherein the portion of the predictive picture that is decoded has a substantially direct correspondence to the portion of the information in the memory that is being updated.

6. The method according to claim 5, wherein the segment of video is an MPEG video segment that does not contain any intra pictures and each of the plurality of predictive pictures contains intra macroblocks.

7. The method according to claim 6, wherein the portion of the predictive picture is comprised of intra macroblocks.

8. The method according to claim 1, wherein a playback speed of the fast motion trick mode in a forward direction is greater than 3X.

9. The method according to claim 1, wherein the information stored in the memory is a picture.

10. The method according to claim 9, wherein the picture stored in the memory is initially a properly decoded picture.

11. A system for producing a trick mode playback of a segment of video containing a plurality of predictive pictures comprising:
    a memory for storing information; and
    a video processor programmed to:
        (a) decode a portion of a predictive picture from the plurality of predictive pictures without decoding the predictive picture in its entirety;
        (b) update a portion of information stored in the memory with the portion of the predictive picture; and
        (c) repeat steps (a) and (b) during the trick mode playback such that a portion of each of a predetermined number of subsequent predictive pictures are decoded and used to update a portion of the information subsequently stored in the memory.

12. The system according to claim 11, wherein each subsequent predictive picture has been recorded after the predictive picture.

13. The system according to claim 11, wherein each subsequent predictive picture has been recorded prior to the predictive picture.

14. The system according to claim 11, wherein the video processor is further programmed to update a portion of the information stored in the memory exclusively with the portion of the predictive picture.

15. The system according to claim 14, wherein the portion of the predictive picture that is decoded has a substantially direct correspondence to the portion of the information in the memory that is being updated.

16. The system according to claim 15, wherein the segment of video is an MPEG video segment that does not contain any intra pictures and each of the plurality of predictive pictures contains intra macroblocks.

17. The system according to claim 16, wherein the portion of the predictive picture is comprised of intra macroblocks.

18. The system according to claim 11, wherein a playback speed of the fast motion trick mode in a forward direction Is greater than 3X.

19. The system according to claim 11, wherein the information stored in the memory is a picture.

20. The system according to claim 19, wherein the picture stored in the memory is initially a properly decoded picture.

* * * * *